United States Patent
Grede et al.

(10) Patent No.: US 9,157,334 B2
(45) Date of Patent: Oct. 13, 2015

(54) DUAL-FLOW TURBOMACHINE FOR AIRCRAFT, INCLUDING STRUCTURAL MEANS OF RIGIDIFYING THE CENTRAL CASING

(75) Inventors: Audrey Grede, Brie Comte Robert (FR); Jacky Raphael Michel Derenes, Corbeil-Essonnes (FR); Clarisse Savine Mathilde Reaux, Saint Martin de Bossenay (FR); Guilhem Seize, Corbeil-Essonnes (FR)

(73) Assignee: SNECMA, Paris (FR)

(*) Notice: Subject to any disclaimer, the term of this patent is extended or adjusted under 35 U.S.C. 154(b) by 796 days.

(21) Appl. No.: 13/504,009

(22) PCT Filed: Nov. 2, 2010

(86) PCT No.: PCT/EP2010/066609
§ 371 (c)(1),
(2), (4) Date: Apr. 25, 2012

(87) PCT Pub. No.: WO2011/054806
PCT Pub. Date: May 12, 2011

(65) Prior Publication Data
US 2013/0195640 A1    Aug. 1, 2013

(30) Foreign Application Priority Data

Nov. 4, 2009 (FR) .................. 09 57800

(51) Int. Cl.
*F01D 25/24* (2006.01)
*F04D 29/40* (2006.01)
(Continued)

(52) U.S. Cl.
CPC .............. *F01D 25/24* (2013.01); *F01D 25/28* (2013.01); *F02C 7/00* (2013.01); *F02K 3/06* (2013.01); *F04D 29/403* (2013.01); *F05D 2240/14* (2013.01); *F05D 2250/30* (2013.01)

(58) Field of Classification Search
CPC ....... F01D 25/24; F01D 25/28; F04D 17/025; F04D 29/403; F02K 3/06; F02C 7/20; F05D 2240/14; B64D 2027/268
USPC .............. 415/213.1, 214.1, 215.1, 189, 219.1, 415/220, 201, 108, 182.1; 60/796, 797; 244/54
See application file for complete search history.

(56) References Cited

U.S. PATENT DOCUMENTS 6,488,469 B1   12/2002  Youssef et al.
6,513,335 B2 *  2/2003  Fukutani ..................... 60/785
(Continued)

FOREIGN PATENT DOCUMENTS

EP   1 568 868   8/2005
EP   1 571 081   9/2005
(Continued)

OTHER PUBLICATIONS

International Search Report Issued Feb. 11, 2011 in PCT/EP10/66609 Filed Nov. 2, 2010.

*Primary Examiner* — Edward Look
*Assistant Examiner* — Jesse Prager
(74) *Attorney, Agent, or Firm* — Oblon, McClelland, Maier & Neustadt, L.L.P.

(57) ABSTRACT

A turbomachine for an aircraft including a mechanism forming a case fitted in a rear extension of an inner ferrule of an intermediate casing, and positioned around a central casing. The mechanism includes a structural upstream ferrule assembled on the inner ferrule and defining a front portion of a surface internally delimiting a secondary vein, and a main case extending on the upstream ferrule towards the rear. The turbomachine further includes a structural mechanism rigidifying the central casing, surrounded by the case, and extending towards the rear between the upstream ferrule and the central casing on which these mechanisms are assembled.

7 Claims, 4 Drawing Sheets

(51) Int. Cl.
*F01D 25/28* (2006.01)
*F02C 7/00* (2006.01)
*F02K 3/06* (2006.01)

(56) References Cited

U.S. PATENT DOCUMENTS

| | | | |
|---|---|---|---|
| 7,266,941 B2* | 9/2007 | Eleftheriou et al. | 60/226.1 |
| 7,363,762 B2* | 4/2008 | Montgomery et al. | 60/685 |
| 7,827,798 B2* | 11/2010 | Commaret et al. | 60/751 |
| 2005/0172609 A1 | 8/2005 | Beutin et al. | |
| 2005/0194493 A1 | 9/2005 | Marche | |
| 2008/0069690 A1* | 3/2008 | Ivakitch et al. | 415/213.1 |
| 2008/0072572 A1 | 3/2008 | Beutin et al. | |
| 2009/0175716 A1* | 7/2009 | Vetters | 415/144 |
| 2010/0047059 A1* | 2/2010 | Gentils et al. | 415/145 |
| 2010/0047066 A1 | 2/2010 | Derenes Jacky et al. | |

FOREIGN PATENT DOCUMENTS

| | | |
|---|---|---|
| EP | 1 902 952 | 3/2008 |
| EP | 2 022 973 | 2/2009 |
| WO | 02 29252 | 4/2002 |

* cited by examiner

DUAL-FLOW TURBOMACHINE FOR AIRCRAFT, INCLUDING STRUCTURAL MEANS OF RIGIDIFYING THE CENTRAL CASING

BACKGROUND OF THE INVENTION

1. Field of the Invention

The present invention relates generally to a dual-flow turbomachine for aircraft, preferably of the turbojet type.

2. Description of the Related Art

In these turbomachines, a known problem lies in the deflection of the central casing enclosing the gas generator, where the consequence of this deflection in the transverse axis is to accelerate the wear and tear of the compressor's rotating blades, and therefore to increase the clearances at the ends of the blades. The consequence of this effect is a substantial reduction of the overall efficiency of the turbomachine.

BRIEF SUMMARY OF THE INVENTION

To address this problem of deflection of the central casing the invention proposes a dual-flow turbomachine for aircraft including:

an intermediate casing including an inner ferrule and an outer ferrule between which structural arms are fitted, where the inner ferrule has a first surface internally delimiting an annular secondary vein;

a central casing extending the said intermediate casing towards the rear; and means forming a case fitted in the rear extension of the said inner ferrule of the intermediate casing, and positioned around the said central casing, where these means have a second surface internally delimiting the annular secondary vein positioned in the rear extension of the said first internal delimitation surface.

According to the invention, the said means forming a case include firstly a structural upstream ferrule assembled on the inner ferrule of the intermediate casing, and defining the front portion of the second internal delimitation surface, and secondly a main case extending the said upstream ferrule towards the rear. In addition, the said turbomachine includes structural means of rigidifying the central casing, surrounded by the said main case, and extending towards the rear between the upstream ferrule and the central casing on which these means are assembled.

The invention consequently proposes a simple, clever and compact solution enabling the deflection of the central casing during operation of the turbomachine to be limited, therefore implying an increase of the turbomachine's overall performance.

According to a first preferred embodiment of the present invention, the said structural means of rigidifying the central casing take the form of an open-worked annular structure.

According to a second preferred embodiment of the present invention, the said structural means of rigidifying the central casing take the form of multiple connecting rods spaced circumferentially one from another.

The said structural means of rigidifying the central casing preferably extend roughly parallel to the lengthways axis of the turbomachine.

The said main case preferably includes multiple aerodynamic panels assembled on support struts added at their front end on to the structural internal ferrule, and at their rear end on to a support ring located close to a junction between the said central casing and an exhaust casing which extends it towards the rear.

The said structural means of rigidifying the central casing are preferably assembled on a portion of the latter located in line with a junction surface between a compressor and a combustion chamber of the turbomachine.

The turbomachine preferably includes a centrifugal high-pressure compressor, enabling the central casing, in line with a downstream end of the compressor, to be moved as far as possible from the lengthways axis of the engine. This portion of the central casing can then, as mentioned above, be used for connecting the structural rigidification means.

BRIEF DESCRIPTION OF THE SEVERAL VIEWS OF THE DRAWINGS

Other advantages and characteristics of the invention will appear in the non-restrictive detailed disclosure below.

This description will be made with reference to the attached illustrations, among which:

FIG. 3b represents an exploded view of that of FIG. 3a; and

DETAILED DESCRIPTION OF THE INVENTION

Figure 1:
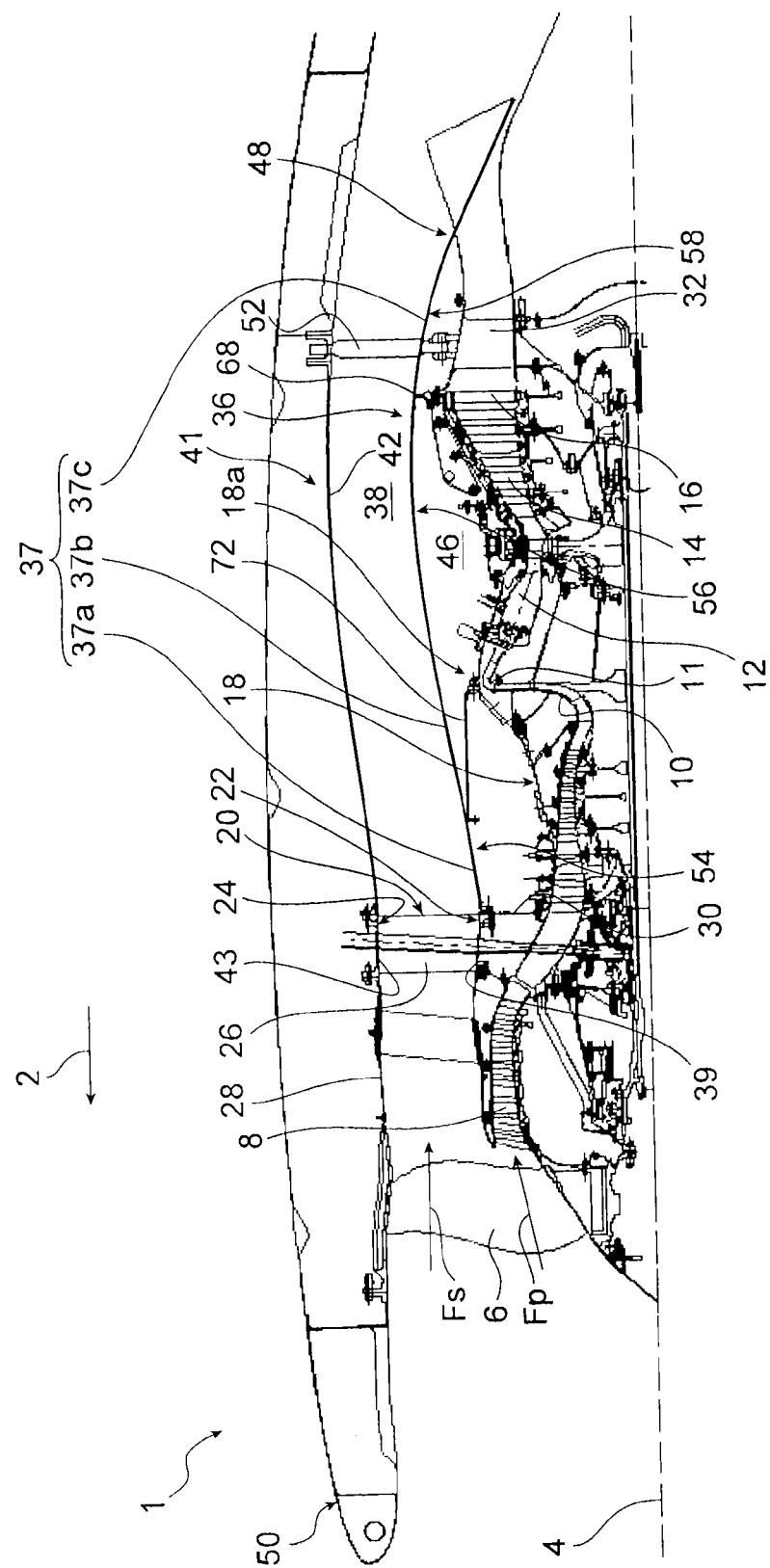
FIG. 1 represents a schematic lengthways half-section view of a dual-flow turbojet for aircraft, according to a first preferred embodiment of the present invention.

With reference firstly to FIG. 1, an aircraft turbojet 1 according to a first preferred embodiment can be seen. In the description below, the terms "front" and "rear" must be considered relative to the forward direction of the aircraft caused by the thrust of the turbojet, where this direction is represented schematically by arrow 2. In addition, the terms "upstream" and "downstream" must be considered relative to a principal flow direction of the gases within the turbojet, contrary to the direction of movement 2 of the aircraft.

Turbojet 1, of lengthways axis 4, includes from upstream to downstream a fan 6, a low-pressure compressor 8, a high-pressure compressor 10, an annular combustion chamber 12, a high-pressure turbine 14 and a low-pressure turbine 16. The compressors, the turbines and the combustion chamber constitute the gas generator, which is partly closed by a central casing centred on axis 4, and which is traversed by a primary flow Fp of the turbojet.

High-pressure compressor 10 is, in this case, centrifugal, and therefore includes a centrifugal impeller which, in line with a downstream end of this impeller, enables central casing 18 to be moved radially as far as possible away from axis 4. This results in the presence of a portion 18a of the central casing, located in line with a junction zone 11 between the centrifugal impeller and combustion chamber 12, which is therefore radially distant from axis 4, protruding towards the outside relative to its upstream and downstream adjacent portions.

This central casing 18 extends towards the rear an intermediate casing 20 fitted with a concentric inner ferrule 22 and a concentric outer ferrule 24, between which structural arms 26 connecting them are fitted. Outer ferrule 24 is located in the rear aerodynamic extension of fan casing 28, whereas inner ferrule 22 is located radially towards the exterior relative to the front end of central casing 18, attached on to a hub 30 of the intermediate casing.

In addition, the rear end of central casing 18 is extended by an exhaust casing 32, downstream from low-pressure turbine 16.

All the abovementioned casings are attached to one another, in order to form jointly a structure through which static and dynamic forces transit.

First means 36 forming a case are fitted in the rear aerodynamic extension of inner ferrule 22, and are positioned around central casing 18. These means, called inner fan ducts, have externally an annular surface 37 internally delimiting an annular secondary vein 38, traversed by secondary flow Fs of the turbojet. Surface 37 is located in the rear aerodynamic extension of another surface 39 which is also used to delimit internally annular secondary vein 38, where this surface 39 is defined by inner ferrule 22. In addition, downstream from surface 37 is a mixer 48, the known function of which lies in mixing the primary Fp and secondary Fs flows.

Annular space 46 left free between central casing 18 and the first means forming a case acts as a compartment, called a "core compartment", in which equipment is fitted.

Second means 41 forming a case are fitted concentrically and externally to the abovementioned first means 36, in the rear aerodynamic extension of outer ferrule 24. These means, called outer fan ducts, have internally an annular surface 42 externally delimiting vein 38. Surface 42 is located in the rear aerodynamic extension of another surface 43 which is also used for externally delimiting annular secondary vein 38, where this surface 43 is defined by outer ferrule 24. These second means forming a case are preferably attached to nacelle 50. In addition, they are connected to exhaust casing 32 by multiple connecting rods 52 connected to the casing, fitted in a transverse plane of the turbojet, and traversing the said first means 36 forming a case, the connection of which with mixer 48 is located downstream from these connecting rods 52.

Concerning first means 36 forming a case, they are broken down into three axially adjacent portions, where the first portion is a structural upstream ferrule 54, the second is a main case 56, preferably non-structural, and the third portion is an aerodynamic joining ring 58 between main case 56 and mixer 48.

With reference at present to FIGS. 1 to 3b, upstream structural ferrule 54, which is preferably made of metal, extends roughly parallel to axis 4, on which it is centred. Its front end is attached by a flange to the rear end of inner ferrule 22 of the intermediate casing, such that aerodynamic surface 39 is located in the forward continuity of front portion 37a of surface 37 internally delimiting annular secondary vein 38.

For its part, its rear end is attached to the front end of main case 56, such that aerodynamic surface 37a is located in the forward continuity of main portion 37b of internal delimitation surface 37, defined by case 56.

In addition, aerodynamic junction ring 58 between main case 56 and mixer 48 has a front end attached to the rear end of main case 56, such that aerodynamic surface 37b is located in the front continuity of rear portion 37c of internal delimitation surface 37, defined by this ring 58. Ring 58 has recesses 59 enabling connecting rods 52 which traverse it to pass through, in order to connect exhaust casing 32 to second means 41 forming the outer case.

Aerodynamic surfaces 39, 37a, 37b, 37c thus form jointly a continuous surface internally delimiting secondary flow Fs.

Figure 3A:
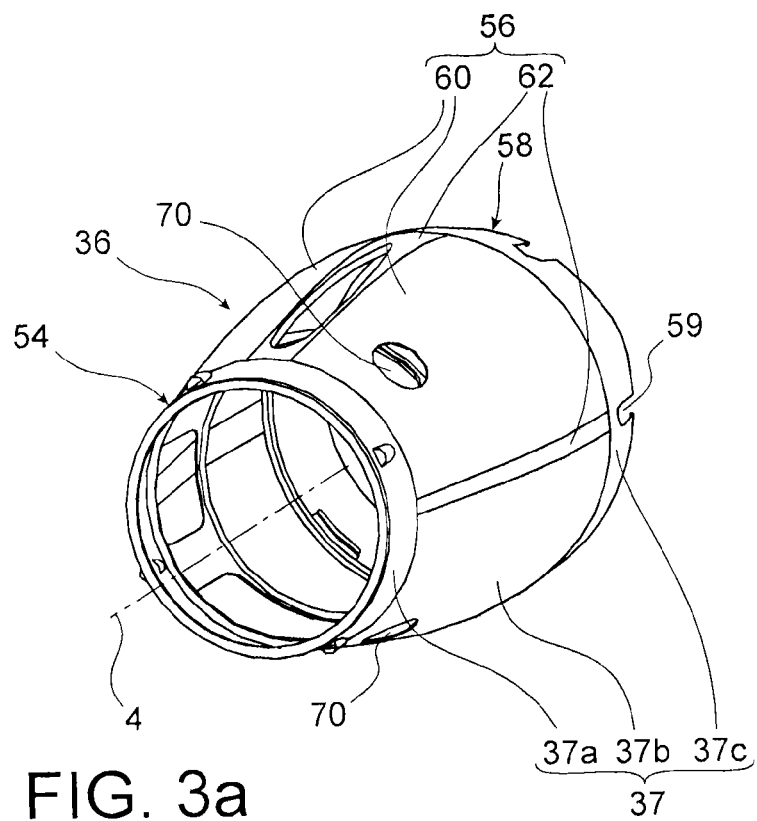
FIG. 3a represents a perspective view of the means forming a case internally delimiting the secondary vein of the turbojet shown in FIG. 1.
Figure 3B:
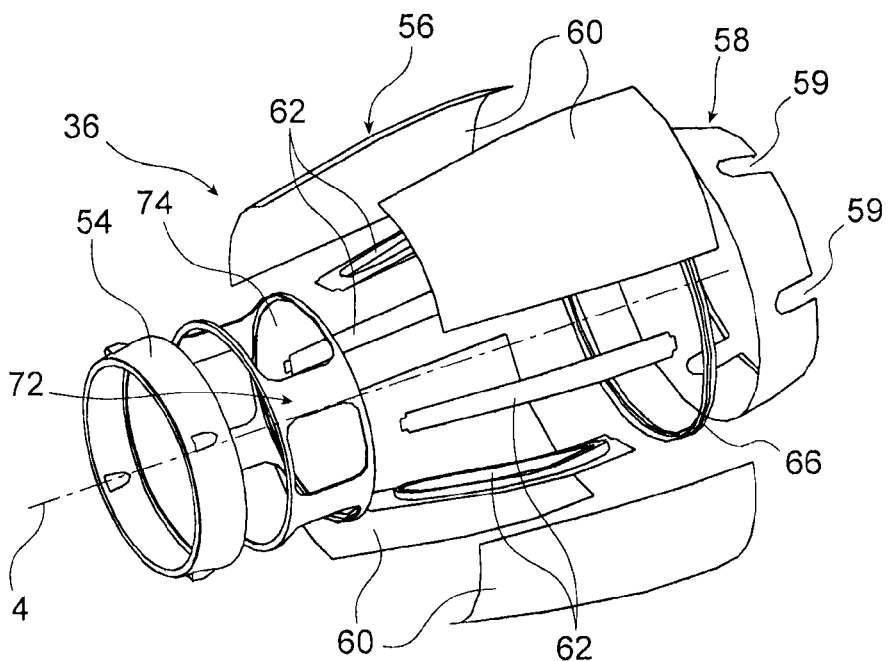

With reference more specifically to FIGS. 3a and 3b, it can be seen that main case 56 includes multiple aerodynamic panels 60, together with support struts 62 supporting panels 60. There are, for example, four struts 62, distributed at 90° from one another, and each extending between a front end assembled securely on the rear end of structural upstream ferrule 54, and a rear end assembled on a support ring 66 centred on axis 4. This support is around and close to a junction between central casing 18 and exhaust casing 32, being connected to it by conventional means, for example of the pin type, shown schematically and referenced 68 in FIG. 1.

Each panel 60 is then supported and attached by two directly consecutive struts 62, respectively in the area of its two circumferential ends. Its upstream and downstream ends, for their part, are located in the aerodynamic continuity of structural upstream ferrule 54 and ring 58, respectively. In addition, these panels 60, which form aerodynamic surface 37b jointly with the uncovered portions of struts 62, are preferentially treated acoustically, and have manholes 74 for access to the equipment of compartment 46. With this regard, it is desirable for manholes also to be included in struts 62.

Figure 2:
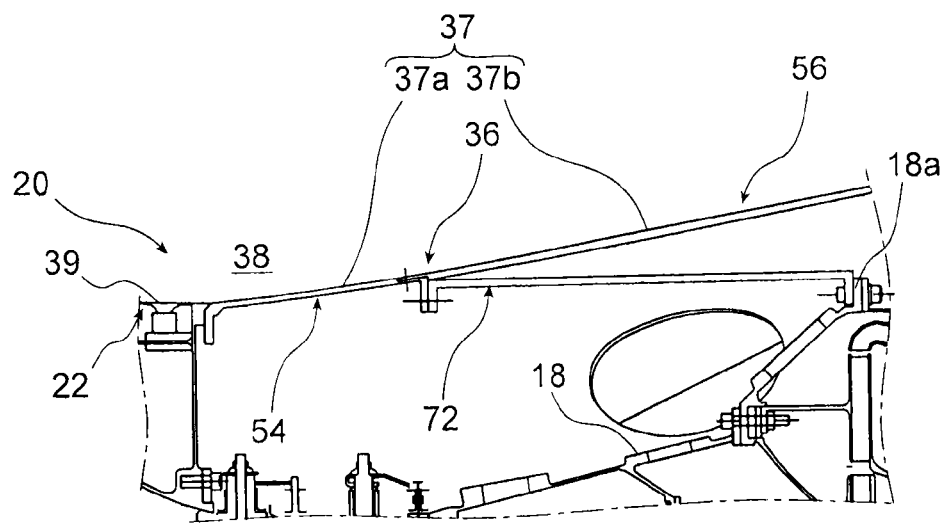
FIG. 2 represents a partial section view showing in detail the structural means of rigidifying the central casing of the turbojet shown in the previous figure.

One of the features of the present invention lies in the fact that the turbojet also includes structural means of rigidifying the central casing, where these means take, in this case, the form of an open-work annular structure 72. This structure 72 shaped like a ferrule, which extends roughly parallel to axis 4, is fitted in the rear extension of structural upstream ferrule 54. As can be seen in FIG. 2, its front end is indeed assembled securely by flanges bolted on to the rear end of structural upstream ferrule 54, as is main case 56 which surrounds it. The proposed design is thus such that structural upstream ferrule 54, performing aerodynamic and mechanical functions, is divided towards the rear into a main case 56 providing the continuity of the aerodynamic function, and into an annular structure 72 providing the continuity of the mechanical function.

Structure 72 extends towards the rear with a roughly constant diameter which is identical to that of structural upstream ferrule 54, as far as its rear end assembled securely by bolts on to annular portion 18a of the central casing, located in line with junction zone 11 between the centrifugal impeller of high-pressure compressor 10 and combustion chamber 12. This annular rigidification structure 72 is therefore at a substantial radial distance from axis 4, enabling it to be subjected only to minor thermal stresses.

Perforations 74 in the form of manholes can be made in this structure, again so as to allow access to the equipment of compartment 46.

With this design, substantial forces can transit in succession through hub 30, structural upstream ferrule 54, annular rigidification structure 72, and central casing 18, thus giving the central casing a mechanical resistance to the high deflection.

Figure 4:
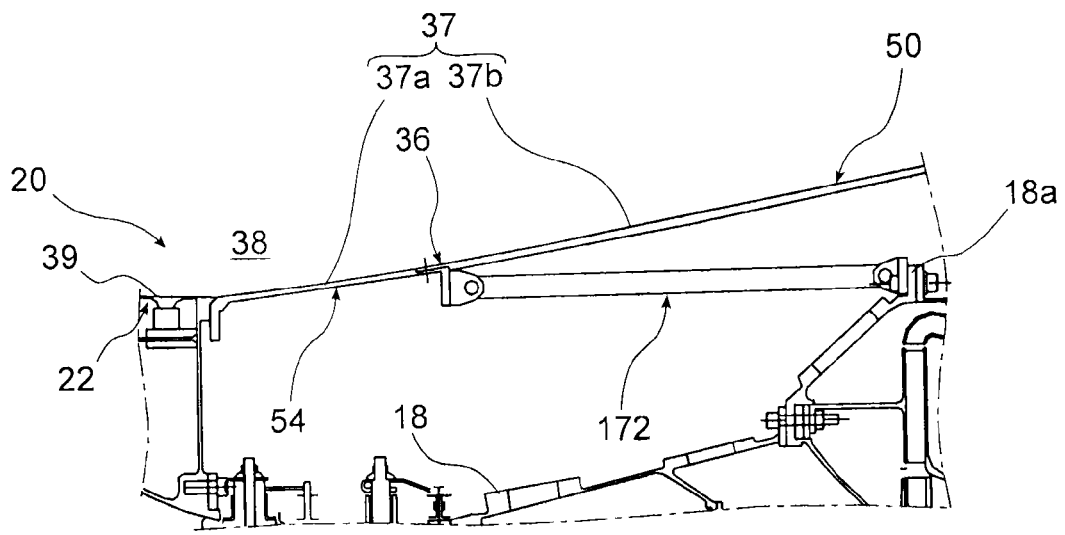
FIGS. 4 and 5 show views which are respectively similar to those of FIGS. 2 and 3a, with the turbojet shown in the form of a second preferred embodiment of the present invention.
Figure 5:
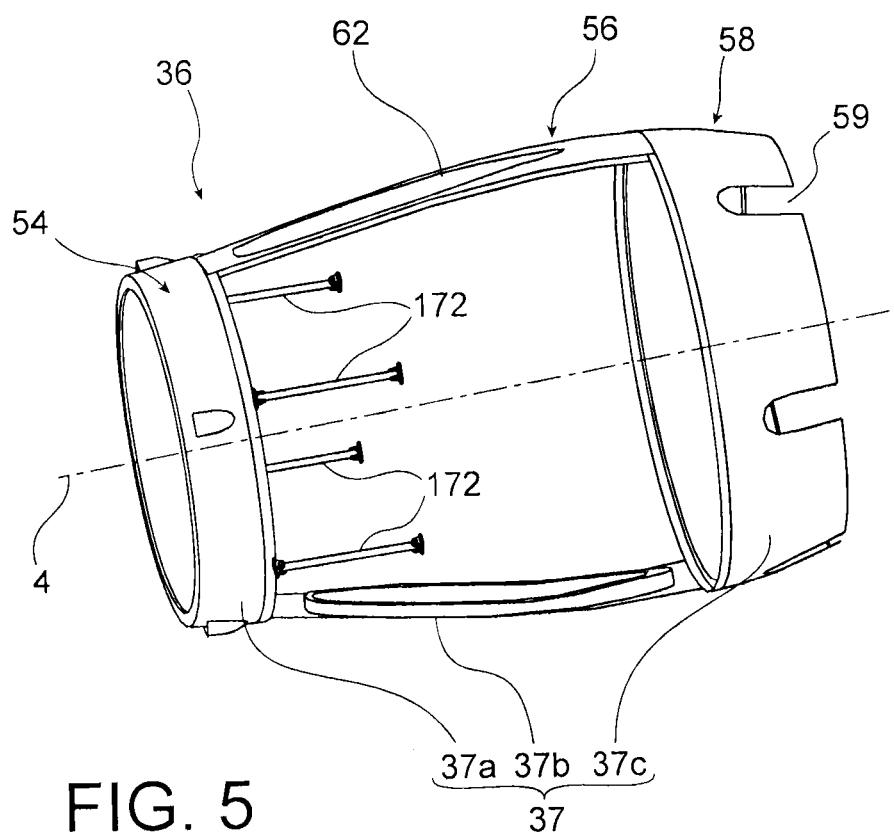

According to a second preferred embodiment shown in FIGS. 4 and 5, the sole modification made compared to the first embodiment described above lies in the design of the structural rigidification means, which in this case take the form of multiple connecting rods 172 spaced circumferentially one from another, and each roughly parallel to axis 4.

Naturally, various modifications can be made by the skilled man in the art to the invention which has just been described, solely as non-restrictive examples.

The invention claimed is:

1. A dual-flow turbomachine for an aircraft comprising:
an intermediate casing including an inner ferrule and an outer ferrule between which structural arms are fitted, wherein the inner ferrule includes a first internal delimitation surface internally delimiting an annular secondary vein;

a central casing extending the intermediate casing rearward; and means forming a case fitted in a rear extension of the inner ferrule of the intermediate casing, and positioned around the central casing, wherein the means includes a second internal delimitation surface internally delimiting the annular secondary vein positioned in the rear extension of the first internal delimitation surface;

wherein the means forming a case includes a structural upstream ferrule assembled on the inner ferrule of the intermediate casing, and defining a front portion of the second internal delimitation surface, and a main case extending the upstream ferrule towards the rear, wherein the turbomachine further comprises structural means for rigidifying the central casing, surrounded by the main case, and extending rearward between the upstream ferrule and the central casing on which the structural means for rigidifying the central casing is assembled, and wherein the structural means for rigidifying the central casing extends roughly parallel to a lengthways axis of the turbomachine, from a front end of the structural means for rigidifying the central casing assembled securely to a rear end of the structural upstream ferrule, to a rear end of the structural means for rigidifying the central casing assembled securely to the central casing.

2. A turbomachine according to claim 1, wherein the structural means for rigidifying the central casing is in a form of an open-worked annular structure.

3. A turbomachine according to claim 1, wherein the structural means for rigidifying the central casing is in a form of multiple connecting rods spaced circumferentially one from another.

4. A turbomachine according to claim 1, wherein the main case includes multiple aerodynamic panels assembled on support struts added at front ends thereof on to the structural upstream ferrule, and at rear ends thereof on to a support ring located close to a junction between the central casing and an exhaust casing that extends the central casing rearward.

5. A turbomachine according to claim 1, wherein the structural means for rigidifying the central casing is assembled on a portion of the central casing located in line with a junction zone between a compressor and a combustion chamber of the turbomachine.

6. A turbomachine according to claim 1, further comprising a centrifugal high-pressure compressor.

7. A turbomachine according to claim 1, wherein the structural upstream ferrule extends roughly parallel to the lengthways axis of the turbomachine, from a front end of the structural upstream ferrule attached to a rear end of the inner ferrule of the intermediate casing to the rear end of the structural upstream ferrule.

* * * * *

UNITED STATES PATENT AND TRADEMARK OFFICE
CERTIFICATE OF CORRECTION

| | | |
|---|---|---|
| PATENT NO. | : 9,157,334 B2 | Page 1 of 1 |
| APPLICATION NO. | : 13/504009 | |
| DATED | : October 13, 2015 | |
| INVENTOR(S) | : Audrey Grede et al. | |

It is certified that error appears in the above-identified patent and that said Letters Patent is hereby corrected as shown below:

In the specification,

Col. 2, line 51, change "casing centred" to --casing 18 centred--.

Signed and Sealed this
Eighth Day of March, 2016

Michelle K. Lee
*Director of the United States Patent and Trademark Office*